Nov. 10, 1925.
S. MILLAR
1,561,344
PULSATOR FOR MILKING MACHINES
Filed Aug. 29, 1924
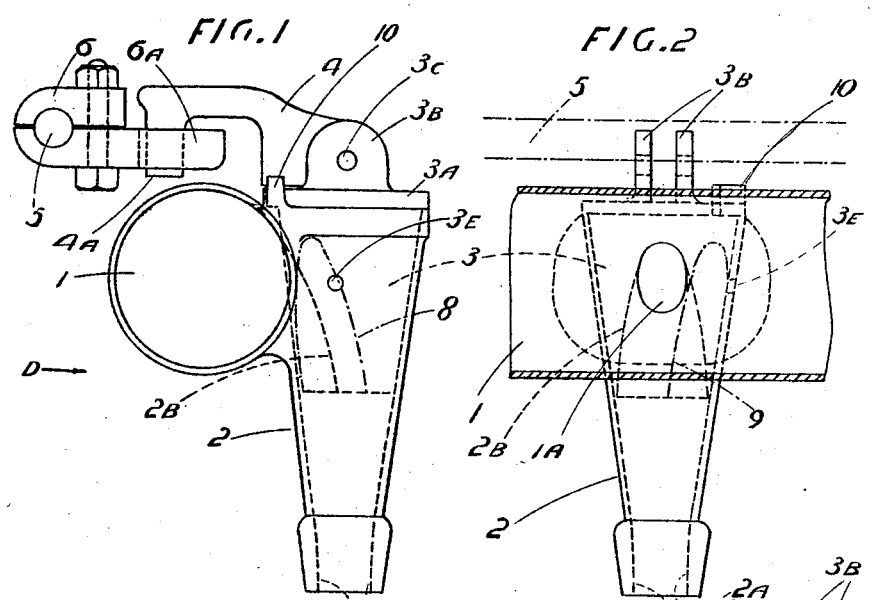
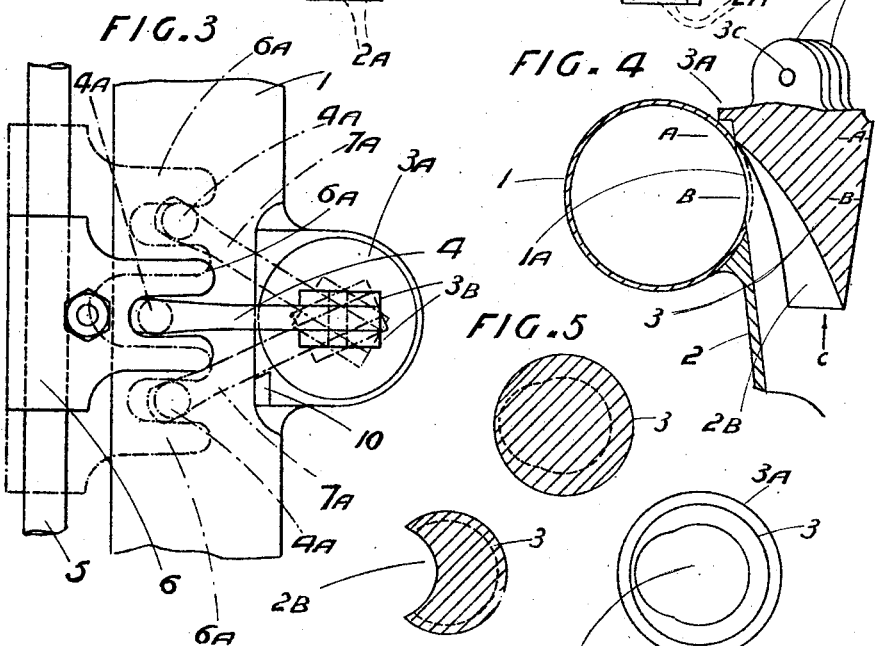
Inventor.
S. Millar,
by
atty.

Patented Nov. 10, 1925.

1,561,344

UNITED STATES PATENT OFFICE.

SAMUEL MILLAR, OF DUNEDIN, NEW ZEALAND.

PULSATOR FOR MILKING MACHINES.

Application filed August 22, 1924. Serial No. 734,982.

*To all whom it may concern:*

Be it known that I, SAMUEL MILLAR, a subject of King George V of Great Britain, residing at 40 Dowling Street, Dunedin, Otago, in the Dominion of New Zealand, have invented certain new and useful Improvements in Pulsators for Milking Machines, of which the following is a specification.

This invention relates to pulsators, particularly for use in connection with inflatorless teat cups.

The object of the invention is to provide a pulsator suitable for successfully operating inflatorless teat cup milking plants, the said pulsator having fewer working parts and being readily accessible for cleaning purposes.

In the drawings accompanying this specification,

Figure 1 is an elevation of a pulsator, the view showing the pulsator attached to the overhead milk pipe.

Figure 2 is a view of Figure 1, looking in the direction of the arrow-head D.

Figure 3 is a plan view of Figure 1; the dot and dash lines showing the various positions of the plug member of the tap, to open and close to communicate between the overhead milk pipe and the teat cups.

Figure 4 is a part sectional elevation, showing the overhead milk pipe, a part of the body member, and the tapered plug member of the mechanically operated tap; the said tapered member being shown in the position of open communication between the overhead milk pipe, vacuum pump and teat cups.

Figure 5 is a section of the tapered plug member on A—A, Figure 4.

Figure 6 is a section on B—B, Figure 4.

Figure 7 is a view of the tapered plug member, looking in the direction of arrow head C, Figure 4.

The pulsator consists of what may be termed a mechanically operated tap, placed near to or attached, as indicated in the drawings, to the overhead milk pipe 1, forming a communication between the said overhead milk pipe 1 and the down pipe (not shown in the drawings) leading to the teat cups.

The mechanical tap consists of a body part 2, and a plug 3. There is a flange $3^A$ formed preferably integral with the plug 3, and upon the surface of the said flange $3^A$ there are lugs $3^B$ projecting upwards, and provided with a pivoted pin $3^C$ to which a connecting member 4 is pivotally mounted; the said connecting member 4 is provided for the purpose of operating the plug; motion is transmitted by a rod 5, which is driven by suitable means, (not indicated in the drawings) for example, an eccentric keyed to a motion shaft in the engine room, the said eccentric imparting a reciprocal motion to the rod 5, then to the plug 3 through the medium of a clamp 6, which engages with a lug $4^A$ on the member 4, by contact with the furcated extension $6^A$ of the clamp 6.

In the course of the rod's backward and forward motion, the said motion being transmitted through the clamp 6, and the connecting member 4 to the plug 3, a port $1^A$ in the milk pipe 1 is opened or/and closed to form or/and shut off communication between the milk pipe 1 and the milking unit, (not illustrated) through the orifice indicated by the broken lines at $2^A$, in Figures 1 and 2. The plug 3 is peculiarly fashioned to provide a grooved port indicated by broken lines at $2^B$, in Figures 1 and 2, but more clearly shown in Figure 4, the plug 3 being in section.

The closed position and the open position of the plug 3 is indicated by dot and dash lines at 7 and $7^A$ respectively in Figure 3, and indicated by dot and dash lines 8, and the dash lines $2^B$ in Figure 1 respectively, while in Figure 2 the closed position is indicated by the dot and dash lines 9, and the open by the broken lines $2^B$. When the plug is in a closed position as indicated at 8 and 9, Figures 1 and 2 respectively, an air port $3^E$ is opened to admit air to temporarily break down the vacuum in the teat cups, and it is obvious of course that this air port $3^E$ is closed when the plug 3 moves towards the open position to form vacuum communication between the overhead milking pipe 1 and the teat cups.

There is a lug 10 attached to the plug 3, which forms a guide for the connecting member 4, when erecting the pulsator to enable the assembler to mount the rod 5 and the clamp 6 in their relative positions with the said pulsator, without experimenting.

What I claim as new and desire to secure by Letters Patent is:—

1. In a pulsator for milking machines, a milk pipe, a tapered housing having communication with the milk pipe, a plug mounted for rotation in the housing and formed with a peripheral recess adapted in one position of the plug to establish communication between the interior of the housing and the milk pipe, a rod mounted adjacent and moving longitudinally of the milk pipe, and means connecting said plug and rod wholly beyond the housing and milk pipe for rotating the plug in the housing to control the communication between the milk pipe and the housing.

2. In a pulsator for milking machines, a milk pipe, a tapered housing having communication with the milk pipe, a plug mounted for rotation in the housing and formed with a peripheral recess adapted in one position of the plug to establish communication between the interior of the housing and the milk pipe, said recess being of increased depth longitudinally of the plug, and means operative longitudinally of the milk pipe and connected to the plug beyond the housing for moving the plug to control the communication between the milk pipe and housing.

3. A milking machine pulsator including a mechanically operated member in the form of a rod, as claimed in claim 1, a ported overhead milk pipe, a tapered housing member secured to the said milk pipe at each port therein, a ported plug fitted in the said tapered housing member, lugs formed on the said plug member, a connecting member pivoted to the said lugs, a lug projecting from the said connecting member engaging with a furcated clamp, the said clamp being attached to said rod.

In testimony whereof I have hereunto set my hand.

SAMUEL MILLAR.